United States Patent
Walker et al.

(10) Patent No.: US 11,016,562 B2
(45) Date of Patent: May 25, 2021

(54) METHODS AND APPARATUS FOR CONTROLLING A VIEWPOINT WITHIN DISPLAYED CONTENT BASED ON USER MOTION

(71) Applicant: Sony Interactive Entertainment Inc., Tokyo (JP)

(72) Inventors: Andrew William Walker, London (GB); Richard James Forster, London (GB); Matthew William Sanders, Middlesex (GB); Patrick John Connor, London (GB); Jessica Rose Grant, London (GB); Hans-Werner Gellersen, London (GB); Ludwig Sidenmark, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/560,000

(22) Filed: Sep. 4, 2019

(65) Prior Publication Data

US 2020/0081526 A1 Mar. 12, 2020

(30) Foreign Application Priority Data

Sep. 6, 2018 (GB) ..................... 1814506

(51) Int. Cl.
*G06F 3/01* (2006.01)
(52) U.S. Cl.
CPC .............. *G06F 3/013* (2013.01); *G06F 3/012* (2013.01)

(58) Field of Classification Search
CPC .......... G06F 3/013; G06F 3/012; G06F 3/011; H04N 13/366; G06T 19/006; G09G 5/373
See application file for complete search history.

(56) References Cited

U.S. PATENT DOCUMENTS

| | | | | |
|---|---|---|---|---|
| 9,589,384 | B1 * | 3/2017 | Waggoner | ............... G06F 3/012 |
| 9,596,508 | B2 * | 3/2017 | McCoy | ............ H04N 21/44218 |
| 10,223,573 | B2 * | 3/2019 | George | ................. G06F 3/0346 |
| 2009/0238378 | A1 * | 9/2009 | Kikinis | ................ H04N 13/398 |
| | | | | 381/92 |
| 2010/0315414 | A1 * | 12/2010 | Lowe | ..................... G09G 3/003 |
| | | | | 345/419 |
| 2014/0267420 | A1 | 9/2014 | Schowengerdt | |

(Continued)

OTHER PUBLICATIONS

Combined Search and Examination Report for corresponding GB Application No. 1814506.0, 4 pages, dated Feb. 25, 2019.

(Continued)

*Primary Examiner* — Rodney Amadiz
(74) *Attorney, Agent, or Firm* — Matthew B. Dernier, Esq.

(57) ABSTRACT

A user input system for controlling a viewpoint within displayed content includes a user profile obtaining unit operable to obtain a user profile having information about head motion and eye motion for a user, an input unit operable to receive user inputs relating to a change in viewpoint within displayed content, the user inputs including the user's head motion, and a viewpoint modification unit operable to modify the viewpoint in the displayed content in dependence upon received inputs and the user profile, where the modification to the viewpoint includes a greater motion than the head motion received as an input.

13 Claims, 6 Drawing Sheets

(56) References Cited

U.S. PATENT DOCUMENTS

| | | | | |
|---|---|---|---|---|
| 2014/0313295 A1* | 10/2014 | Dolim | ................... | H04N 13/366 |
| | | | | 348/51 |
| 2017/0287446 A1* | 10/2017 | Young | ...................... | G06F 3/013 |
| 2018/0004285 A1 | 1/2018 | Castleman | | |
| 2018/0096517 A1* | 4/2018 | Mallinson | ................. | G06N 5/04 |
| 2019/0204913 A1* | 7/2019 | Sarkar | ..................... | G06F 3/017 |
| 2019/0255989 A1* | 8/2019 | Rowell | ............. | B60W 60/0017 |
| 2020/0081526 A1 | 3/2020 | Walker | | |

OTHER PUBLICATIONS

Examination Report for corresponding GB Application No. 1814506.0, 5 pages, dated Apr. 16, 2021.

\* cited by examiner

METHODS AND APPARATUS FOR CONTROLLING A VIEWPOINT WITHIN DISPLAYED CONTENT BASED ON USER MOTION

BACKGROUND OF THE INVENTION

Field of the Invention

This disclosure relates to a gaze input system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years there has been a trend towards providing more natural inputs for users of processing devices, such as video consoles or computers. For example, motion sensing controllers may be provided that enable a user to use gestures to input commands rather than relying entirely on button presses. While considered to be an intuitive manner of inputting commands, in some cases this may not be desirable due to the cost or inconvenience associated with the use of dedicated input devices; this is particularly true when applications or hardware have dedicated hardware that cannot be used for other purposes, as users may wish to make use of a number of different applications or hardware arrangements.

Another example of such an input is that of tracking a user with one or more cameras; for example, tracking hand gestures, head motion or eye motion. The cameras may be associated with a games console or a computer, for example, or may be part of a standalone tracking system. Such methods may enable a user to interact with a system without the use of any peripherals, and as such may be considered to be natural and convenient input methods. However, these user-tracking methods may also have a number of potential drawbacks.

For instance, providing gesture-based inputs may require a user to position themselves in an area with a lot of room for movement, which may be inconvenient. Additionally, by having to move body parts the user may become tired or uncomfortable—particularly if the motion is frequent, repetitive, or unnatural to the user, or if they have limited mobility. Such problems may become more apparent when used in combination with a virtual reality (VR) arrangement in which a user views content on a head-mountable display (HMD); in this example use case, the user is unable to see obstacles in the real environment and may need to move more as the (potential) display area is increased (as the user is generally placed in a virtual environment that exists in every direction) relative to a fixed display such as a television.

In view of this, it is considered desirable to provide a more comfortable user experience to enhance the user's enjoyment of interactive content. In particular, a system and method for providing an improved camera-based tracking and interaction may be desirable.

It is in the context of the above problems that the present invention arises.

SUMMARY OF THE INVENTION

It is to be understood that both the foregoing general description of the invention and the following detailed description are exemplary, but are not restrictive, of the invention.

This disclosure is defined by claim 1.

Further respective aspects and features of the disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

While the specification refers largely to arrangements in which an HMD is the display device used to display content to a user, the teachings provided may be equally applicable to more traditional arrangements in which a television (or other display) is used to present content to the user.

Figure 1:
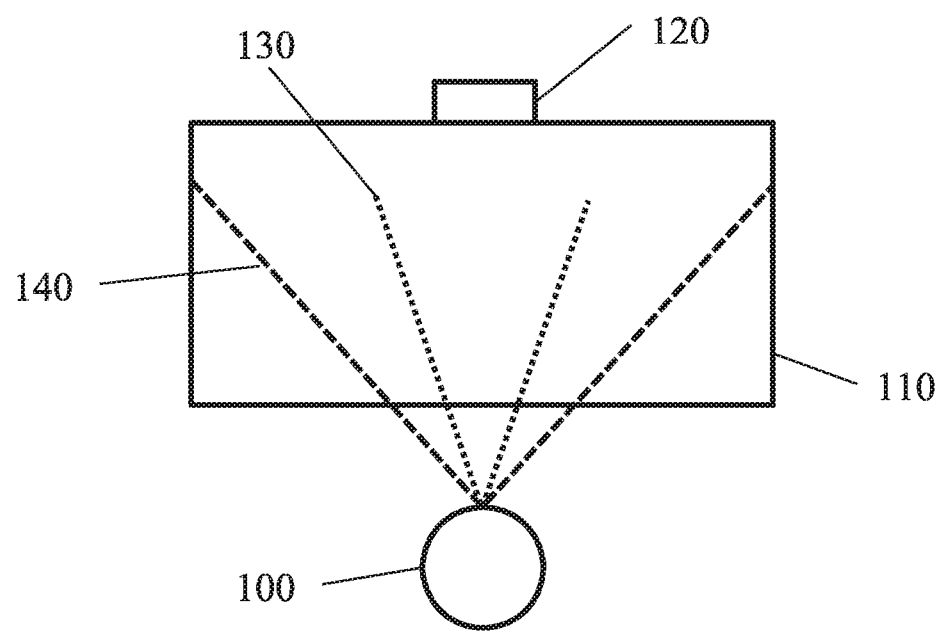
FIG. 1 schematically illustrates a content viewing arrangement.

FIG. 1 provides a schematic illustration of such an arrangement; as is apparent from this illustration, the user's gaze is directed towards only a portion of the display, and as a result the user is required to move their head in order to view other portions of the display.

In this Figure, the user 100 is viewing content presented on the display 110. A camera 120 is also shown on top of the display 110; the camera 120 may be used to track a user's motion (for example, eye, head or body motion). The cone 130 represents the viewing angle for the user 100 looking straight ahead, ignoring peripheral vision areas. The cone 130 may be moved either by the user 100 moving their eyes, head, or whole body (for example). The cone 140 represents the required viewing angle to view the whole of the display 110—as this is clearly larger than the cone 130, it is expected that the user will have to move their head and/or eyes in order to view the whole of the display 110.

Figure 2:
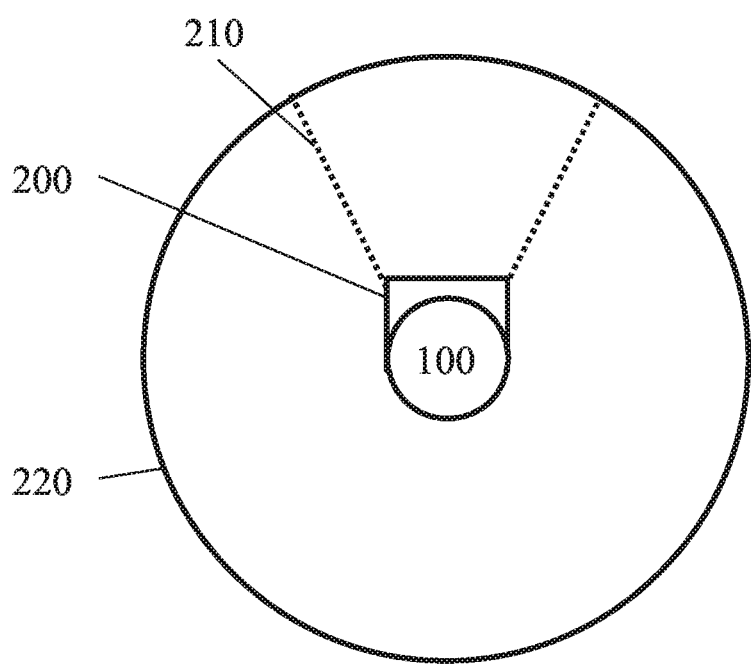
FIG. 2 schematically illustrates a second content viewing arrangement.

An alternative arrangement is shown in FIG. 2, which schematically illustrates a comparable arrangement in which a user 100 instead uses an HMD 200 as a display device. The user 100 is presented with a view corresponding the region 210 of the virtual environment 220. In this case, the user is able to view different areas of the region 210 using eye movement alone, while viewing areas outside of the virtual environment 220 of the region 210 may also require head motion.

In each of these arrangements it is necessary for users to move their head and/or their eyes in order to view all of the content that is displayed (and/or able to be displayed, in the case of the HMD). However, the use of head and/or eye motion for viewing content out of the user's immediate field of view may vary from person to person.

For example, some users may rely heavily on head motion and entirely forgo eye motion—whenever the user wishes to view something that is not directly in front of them, they move their head until the target is directly in front of them. Of course, such users may be rare and it is expected that at least some eye motion is used.

At the other end of the spectrum, there may be users that rely heavily on eye motion, such that head motion is only performed when it is physically impossible for the user to view content at that head position.

It would be expected that most users would exist somewhere on the spectrum between these two extremes, such that different users may use different combinations of head and eye motion to acquire a desired view.

It is generally considered that eye motion is less demanding and more comfortable for a user than head motion, especially during extended viewing sessions. It may therefore be advantageous to tailor a user experience to take into account when a viewer will move their head and/or eyes; this may be of particular interest in view of interactive content, where head and/or eye motion may be used to provide inputs to the content.

Figure 3:
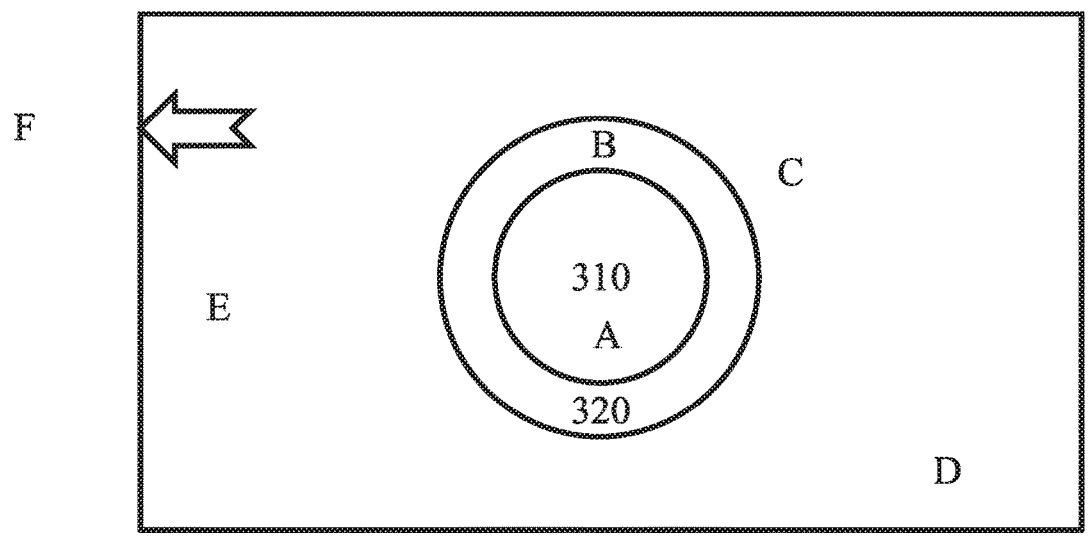
FIG. 3 schematically illustrates a calibration display.

FIG. 3 schematically illustrates a screen that may be displayed to a user during a calibration process for capturing information about head and/or eye motion. A display 300 (corresponding to a view provided by an HMD, for example, or a display screen such as a TV) is shown with concentric circles 310 and 320 that illustrate a user's focus area and a surrounding region of vision respectively.

A number of markers are also shown on the display 300, represented by letters A-E, and the user may be invited to look at each of them in turn. A further marker (F) is shown that is outside of the display 300, but may be viewable by a user changing the viewpoint that is displayed—depending on the arrangement, this may be performed by user input or head motion, for example. An example of a calibration process using this arrangement is provided below.

Firstly, a user is instructed to look at the letter A; as this is within the region 310 this is expected to result in little or no eye motion, and no head motion. The user may be invited to provide an input (such as a button press or spoken command) to indicate that they are looking at the letter A, or this may simply be identified using eye tracking data.

The user is then instructed to look at the letter B. As this is only slightly out of the central area 310 of the user's gaze, it is expected that most users will simply adjust their gaze upwards such that the region 310 is now centred on (or at least contains) the letter B. This would be expected to be performed Following this, the user may then be immediately directed towards the letter C, or may be instructed to return to marker A before progressing to viewing the letter C.

The letter C may not be visible to a user, or only visible in the user's peripheral vision. It would likely be uncomfortable for many users to view the letter C using eye motion alone. Viewing the letter C would therefore be expected to induce a head motion from most users.

The viewing of the letter D provides a similar effect to that of viewing the letter C, albeit more exaggerated. A larger head motion would be expected here that that associated with viewing the letter C, due to the increased distance between letters.

In a similar fashion, the viewing of the letter E would be expected to induce an even larger head motion from the user. When the user transitions between viewing letters with a larger separation, the combination of head and eye motion performed by the user may be identified. For example, a first user may move their head such that the letter appears in the centre of their vision—thereby performing head motion with no eye motion. A second user may move their head only far enough to enable the user to perform their maximum comfortable eye motion in order to view the letter. Other users may perform combinations of head/eye motion that lie between these two, and this may be identified through a number of different transitions being induced by the calibration process.

The final letter, F, that is shown is outside of the display area 300. An arrow is provided that indicates to the user where the letter F may be found—the user should then either provide controller inputs or rotate their head/body sufficiently to cause the letter F to enter the display area 300.

By instructing the user to perform a number of viewpoint changes of different magnitudes and directions, a profile may be generated. For example, the largest distance between markers that a user will view without performing any head motion may be identified. The combinations of head motion, user input, and eye motion used to view a marker a particular distance away may also be identified; for example, a profile may comprise a list of angular separations between displayed objects (such as an entry for every five or ten degrees of separation) and the action performed by the user. Optionally, such angular separation may be separated into horizontal and vertical components with entries for each, since user mobility and behaviour may be different for similarly sized horizontal and vertical angular separations. Similarly optionally, the letters/markers shown in FIG. 3 may be positioned or sequenced to cause at least some predominantly horizontal or predominantly vertical transitions of eye and/or head motion during calibration.

The actions performed may be recorded in any suitable manner; one example of a suitable method is that of a lookup table with three columns. A first column may relate to eye motion, a second to head motion, and a third to body/torso motion. Each of these may comprise a value indicative of the amount of motion performed—for example, an angular change to the viewpoint resulting from each component, or a percentage of the transition motion that is contributed by each component.

Alternatively, or in addition, a categorisation may be applied to each user that matches them to a reference profile that resembles their pattern of eye/head/body motion. In a most basic example, a user could be classed as a 'head-mover' if they move their head more frequently than some threshold amount or an 'eye-mover' if they do not. Any number of categories could be defined, so as to represent the spectrum of different users in a suitably accurate manner.

Of course, the order in which a user is instructed to view different markers may be varied. Different markers may also be provided for different users, and the number of markers used may be selected freely—indeed, the calibration process may be open-ended and continue generating markers until a suitably accurate profile is generated.

In some examples, the order, number, and location of markers may be varied in response to the calibration data as it is generated. For example, markers may be selected to alternately induce head motions and only-eye motions; by doing this, the boundary at which a user begins to use head motions in addition to eye motion may be identified more quickly in some cases.

Alternatively, or in addition, the order, number, and location of markers may be selected in dependence upon user information. For example, a user could provide information about their habits (or information could be gathered by performing tracking pre-calibration) to determine whether significant head motion is expected or not. Similarly, statistical data about a user (such as age, gender, or height) and/or their equipment usage (TV/HMD, distance from display, main applications/application type) may be used to identify an expected profile, and calibration may be performed to identify deviations from this expected profile. Such an expected profile may be derived from statistical data gathered through other calibrations, for example.

Calibrations may also be performed in different use cases, so as to generate a time- or user condition-based profile. For instance, as a user becomes more tired (either at night, on a work/school night, or after a long gaming session, for example) the amount of user head motion may be reduced significantly in favour of eye motion as this would be less energetic for the user. Alternatively, or in addition, changes due to these (or other) factors may be modelled and applied to a single or a small number of calibrations by a user.

The format of markers may be varied in order to provide a more detailed profile; for example, users may respond to different colours in different manners. A visually striking colour, such as a bright yellow or red, may induce a greater head motion than a less visually striking colour, such as a pale blue or green. This may be a result of certain colours either catching the user's attention more due to personal preference, or by being colours associated with particular emotions (such as fear or danger). Similarly, some shapes may have different effects on the user's actions and therefore markers having different shapes may be incorporated into a calibration process.

In some embodiments, the calibration process may incorporate a time-limited element so as to test how a user's reliance on head and/or eye motion varies with varying time pressures (for example, when turning towards something in surprise or to see something before it disappears from view). This may be implemented in a number of ways—for example, a timer may be provided, or the user may be rewarded for performing the calibration process (or a portion of the process) within a particular time. Alternatively, or in addition, markers may be designed so as to encourage a faster head motion by using particular colours or shapes and/or the calibration may be provided in a context that causes a user to become more (or less) excited and therefore react more (or less) energetically.

Once a user profile has been generated, any future calibrations may be tailored so as to be more comfortable for that user. An example is in the case that an initial calibration is performed upon setup of the HMD (or other system), and an application-specific or refresher calibration is performed at a later date. A refresher calibration may be either to ensure that the user's profile has not changed since an earlier calibration, or to assist in calibrating a new eye-tracking arrangement, for example.

In such embodiments it may be possible to identify which areas users do not tend to view with eye motion only, and to reduce the number of markers presented in these areas for calibration purposes (in some cases, reduce the number to zero).

Figure 4:
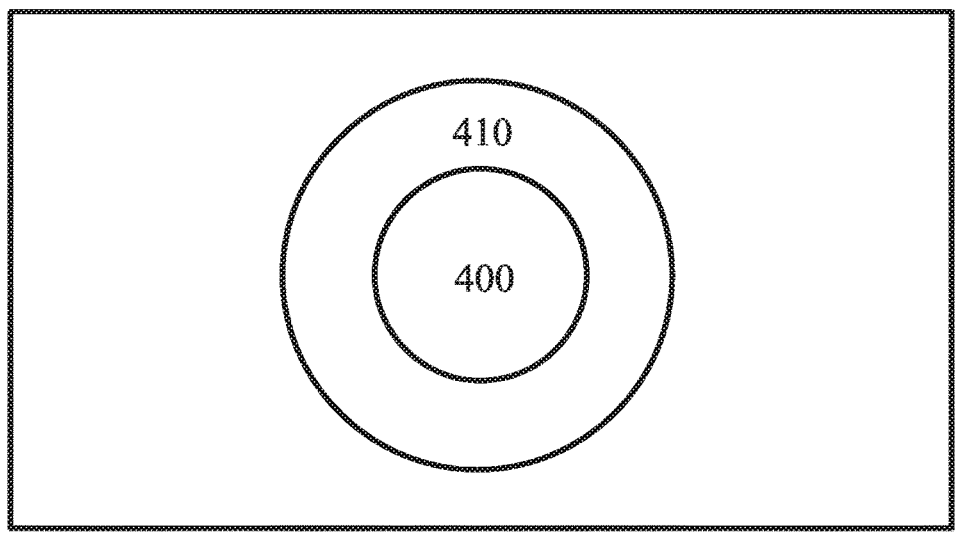
FIG. 4 schematically illustrates an eye-in-head radius.

For example, FIG. 4 shows a central region 400 in which a user is determined to be most comfortable using eye motion alone. This may be an area in which all motions by the user would be eye motion only, or at least an above-threshold percentage.

Surrounding the central region 400 is a secondary region 410 in which the user sometimes uses head motion instead of (or in addition to) eye motion, but would still be comfortable using eye motion alone.

Outside of the secondary region 410 it is taken that the user is not able to view content comfortably with eye motion alone.

Of course, users may be more comfortable moving their eyes and/or head in some directions than others; in such a case, it is not required that the regions 400 and 410 are circular and they may instead take any suitable shape.

In view of this, it is expected that most, or in some embodiments all, calibration markers are present in the regions 400 and 410. While a small number may be outside of the region 410, this number should be limited in view of the fact that it would cause discomfort for the user to view them without moving their head. The sizes of the regions 400 and 410 may be determined in dependence upon previous calibration information or a user's motion profile.

The user profile that is generated may also be used in other alternative/additional ways. In one example, a user's profile information is used to characterise their interactions with displayed content. For instance, 'anomalous' interactions (that is, those actions which deviate from the expected actions as suggested by the user profile) may be taken to be indicative of particular user interest in a displayed object or the like.

In the present application, it is seen as desirable that the user profile should be used to modify the way a user views content that is displayed to them. For example, it is known that it can be uncomfortable for a user to turn their head a large amount towards a viewing target—this is evidenced by the fact that a user's eyes often move towards a target before the head, and that the head rarely fully aligns with the viewing target.

By analysing a user's motion profile (that is, information about the user's preferred combinations of head movement and eye movement to view a target), it is considered that an adaptable movement modification may be applied to a user's inputs in order to aid the viewing process.

Figure 5:
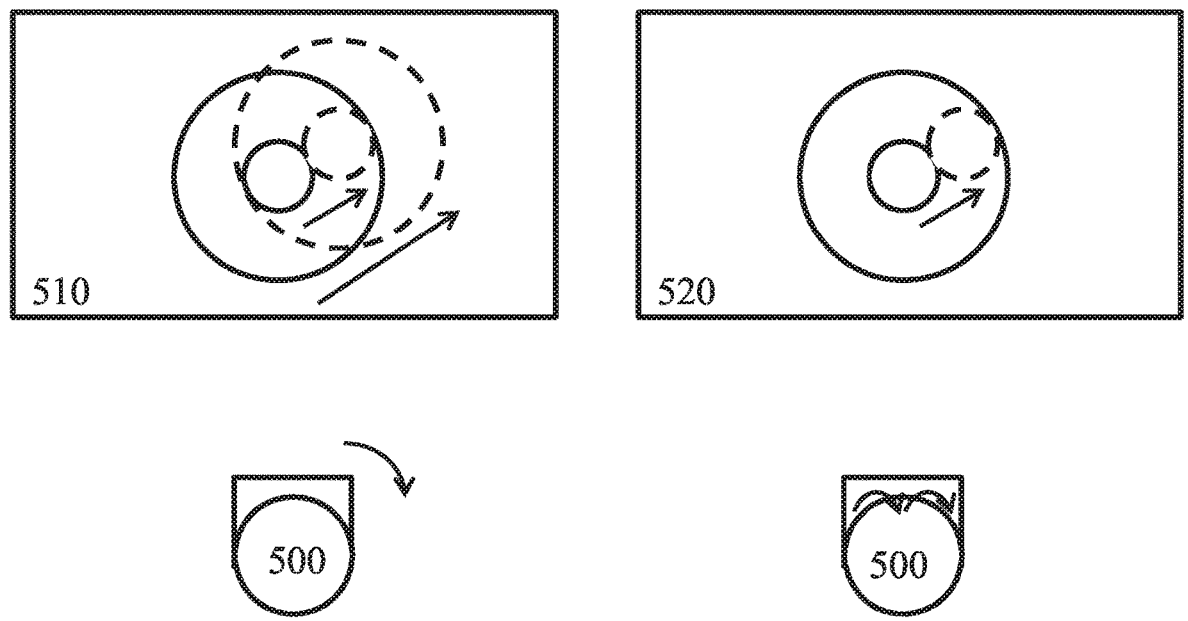
FIG. 5 schematically illustrates examples of two different methods for performing a viewing transition.

FIG. 5 schematically illustrates examples of two different methods for performing a viewing transition. FIG. 5 shows a user wearing an HMD, and the display that is associated with that HMD (although of course, these teachings could be applied to a more typical display screen arrangement such as a television). A viewing transition here means the action performed by a user to transfer their gaze from one part of a display to another. In the examples 510 and 520, the user 500 has moved their gaze and/or eye-in-head radius from the areas denoted by the solid lines to the areas denoted by the dashed lines. The smaller circle shows the focus position (equivalent to the region 400 of FIG. 4) while the larger circle shows the eye-in-head radius (equivalent to the region 410 of FIG. 4).

In the example 510, the user 500 performs the viewing transition by moving their head only, with the eye position remaining stationary with respect to the user's head. As noted above, this method of performing a transition is considered to be rare.

The example 520 shows the opposite method of performing the transition; the user 500 moves only their eyes, with the head position remaining stationary with respect to the display.

Figure 6:
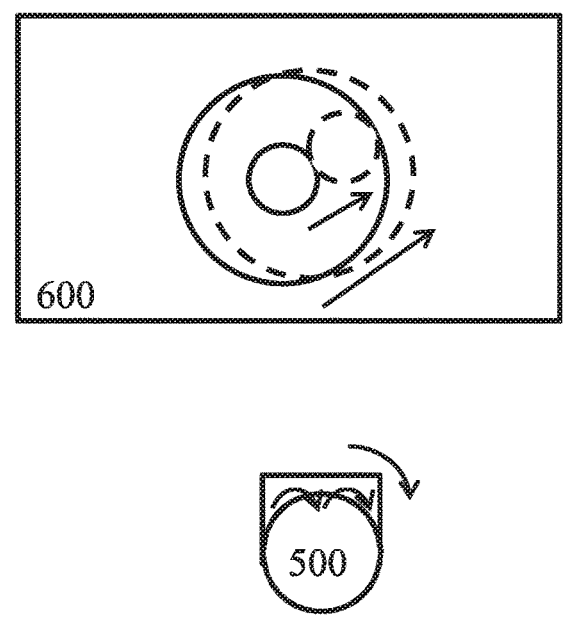
FIG. 6 schematically illustrates a further viewing transition example.

FIG. 6 schematically illustrates the middle-ground between these two examples 510 and 520. In the example 600, the user 500 moves their head a smaller distance than in the example 510 while also moving their eyes as in the example 520 (although to a lesser degree, due to the head motion).

Of course, the respective quantities of head and eye motion used to perform a particular viewing transition will vary from user to user. The information about the respective quantities of each motion for one or more transitions or transition types (such as large/small transitions) is stored in the user profile, as discussed above.

In embodiments of the present disclosure, an amplification of the user's head motions may be provided where appropriate in dependence upon the information contained in the user profile. The amplification has the effect of increasing the magnitude of the viewpoint change in the displayed content that is caused by a user's head motion—that is, a greater change in viewpoint is generated for the same head motion with the amplification applied than without.

For example, the actions of the user 500 in the example 510 would be a suitable candidate for an amplification to be applied due to their reliance on head motion. By amplifying the effect of their head motion as an input for changing the viewpoint that is displayed, the amount of head motion that is required to perform a particular viewing transition may be reduced.

While the description is presented with reference to amplifications of a user's head motions, the specification should not be seen as being limiting in this regard. For example, for a user that experiences hyperactivity it may be preferred to have the change of viewpoint reduced relative to their head motion; in effect, this is the opposite of an amplification. Such a reduction may be implemented in the same fashion as an amplification, and as such specific embodiments of this alternative are not described.

On the contrary, the actions of the user 500 in the example 520 would not be a suitable candidate for an amplification to be applied. This is because they do not make use of head motion for this viewing transition. Of course, an amplification could still be applied for the user 500 in this example 520, but it would not be noticed due to the lack of head motion.

The actions of the user 500 in the example 600 may be a suitable candidate for a small amplification (or no amplification at all, despite the reliance on head motion). This is because the head motion is small, and as such is not expected to cause discomfort.

Of course, that is not to say that an amplification should only be applied for users that make large head motions—while the amount of head motion that may be avoided by scaling larger head motions may be more significant, it may be the case that those users who most avoid using head motion find an amplification equally beneficial. By reducing the amount of head motion required of a user that does not like to perform head motion, the user experience may be improved more than by reducing (by a larger amount) the head motion required of a user that does like to perform head motion.

It should therefore be apparent that the present teachings are equally applicable to head motions of any size, and for both users who do or do not like to perform head motions.

While in some embodiments it is sufficient to define an amplification for each user in dependence upon their usual head and eye motion usage for performing viewing transitions, it may be preferable to consider other factors when determining an amplification to be applied.

A first factor that may be considered is that of the size of the head motion that is being performed. It should be expected that for a number of users it is common that involuntary head motion when viewing content will be performed—the head is unlikely to be completely still even when viewing the same area. Amplification of these motions may be considered to be disruptive, as it would likely make it more difficult for the user to compensate for this head motion with eye motion.

Such an issue may be addressed by placing a threshold on the amount of motion required before an amplification is applied. This threshold may be a uniform threshold applied to all users, or may be determined based upon user profile information indicating an amount of involuntary head motion that is usually performed. Alternatively, or in addition, the threshold may be determined based upon a user's usual reliance on head motion for performing viewing transitions. For example, an eye-mover may have a higher threshold applied as it is considered less likely that they are purposely moving their head.

An amplification may also be determined based upon predictive methods that are used to predict the size of a user's head motion that will be performed for a particular transition; this may also comprise a prediction of the transition that is to be performed.

The prediction of a particular transition may be based upon identification of user preferences relating to the content, in addition to user profile information that describes a typical user motion for a viewing transition from a current viewpoint to a predicted viewpoint. The determination of a predicted viewpoint may be performed in any suitable manner. If a viewing transition that is associated with a large head motion for that user is predicted, then it may be advantageous to apply an increased amplification to the head motion to reduce the amount of head motion required for that transition.

User profile information may also be used to identify characteristics of a particular head motion. For example, a user may accelerate their head more quickly at the beginning of a large head motion than at the beginning of a small head motion. Users tend to move their eyes before the head when performing a viewing transition, and as a result it may be possible to determine from a characteristic eye motion the nature of the head motion that is to follow. It may therefore be possible to identify a transition that is to be performed by the user in this manner. If it is detected that a user is about to perform a large head motion, then a large amplification may be applied.

In some embodiments, a user profile identifies a maximum possible (or maximum comfortable) head motion for that user, and a variable amplification may be provided in dependence upon this maximum. For example, a uniform amplification could be provided that enables a user to view all parts of the display without having to exceed the maximum head motion. Alternatively, a variable amplification could be provided in combination with a predicted head motion (based upon the user profile information, for example) such that a suitable amplification is provided for all content that would otherwise be outside of the maximum head motion. This amplification may be selected to vary in dependence upon the expected motion greater than the maximum that would otherwise be required to view the content.

In some embodiments, an amplification factor may be provided that is dependent upon the content that is being displayed to a user. For example, users may have different head and/or eye motion profiles for viewing transitions for different content types. For example, in a horror movie the user may be on edge and therefore more likely to use head motion than when watching a more relaxing movie. In such a case, the amplification factor may be increased, so as to facilitate faster head motion as well as to relieve the burden of performing large head motions repeatedly. Of course, information about viewing transitions as related to different content types may be determined by the skilled person rather than relying on this example.

An amplification factor is an example of a modification factor that is used to scale an input. A modification factor may be a multiplier that is applied to a detected motion, for example, and may be larger than one (an amplification factor) or smaller than one (a reduction factor). It is possible that corresponding effects to those caused by use of an amplification factor may be provided by modifying this factor to instead be a reduction factor—thereby reducing a viewpoint change instead of amplifying it, for example.

The user profile may comprise information about how the user's reliance on head and eye motion for a particular viewing transition may vary with the viewing duration. For example, during an extended viewing (or gameplay) session a user may become fatigued and therefore less inclined to move their head. Any amplifications that are applied to the user's head motions may therefore be increased as the duration of the viewing increases (and/or, of course, amplifications may be introduced as the duration of the viewing increased). The varying of the amplification, both in terms of when it is implemented and the magnitude of the amplification that is applied, may be determined based upon information in the user profile.

Much of the discussion above has been focussed on a uniform amplification applied to a particular motion. However, in some embodiments it may be advantageous to apply an amplification that comprises an acceleration factor—that is, an amplification that increases with the head motion. This may be advantageous in that small motions are relatively unaffected, while larger head motions may still benefit from the amplification. An appropriate accelerating factor may be derived from information contained in the user profile; for example, the acceleration rate may be faster for users who do not perform such large head motions so as to enable a comparable coverage of the display by a user's head motion to those users who do move their head a greater amount.

In some embodiments, the amplification is only provided for users who are seated in view of the fact that users who are standing have a greater freedom to rotate their bodies in addition to their heads. In some examples, a user may indicate whether they are seated/standing (or just whether they wish the amplification to be performed), while in other examples a detection is made. Such a detection may be performed using image analysis to identify a sitting user from images captured of the user's environment, or by identifying the user as having performed motions characteristic motions of a seated user from body and/or head tracking data.

In some examples, a fixed point of reference or horizon may be provided to a user during the viewpoint transition in order to assist with reducing feelings of discomfort associated with a visual/physical disconnect. Information may be provided in the user profile that identifies an appropriate time for this to be implemented for a user; for example, a threshold amplification amount or movement distance may be used to trigger the provision of a fixed reference point. As each user is likely to be able to manage the discomfort differently (or may be differently susceptible to experiencing it at all), it is considered that it may be useful to implement such a feature on a per-user basis.

Figure 7:
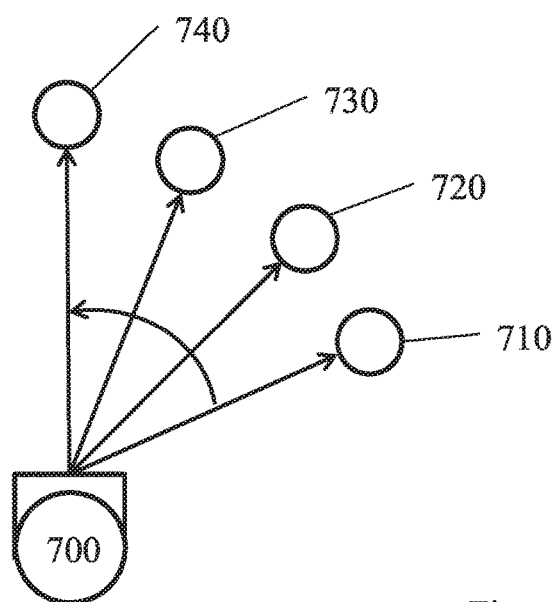
FIG. 7 schematically illustrates an example of a change in viewpoint.

FIG. 7 schematically illustrates an additional example of a change in viewpoint that is affected by user input in conjunction with information that may be present in the user profile. Such a viewpoint changing method may be referred to as 'snap rotation', in which a user is able to press a button (or provide another input, such as a hand gesture or voice command) that is operable to shift the viewpoint by a fixed amount. This can avoid the problem of the visual/physical disconnect by not showing a transition and/or not requiring head motion by the user.

In FIG. 7, the user 700 is able to transition between the initial viewpoint 710 and the final viewpoint 740 via intermediate viewpoints 720 and 730. Each of the transitions shown in FIG. 7 may be associated with a respective button press (or other input).

Such a method of transitioning between the initial viewpoint 710 and the final viewpoint 740 may be seen as being rather disruptive for a user; having to perform multiple transitions may be time consuming, and the user may become disoriented due to the multiple viewpoints shown in a short time period.

It may therefore be advantageous to reduce the number of intermediate viewpoints in a transition between an initial and a final viewpoint. Embodiments of the present arrangement are able to provide such an advantage by using information that may be stored in the user profile.

In some embodiments it is considered that a user's eye position may be indicative of a distance between the first and second viewpoints in a snap rotation. The relationship between the eye position and rotation distance may be determined based upon information about a user's eye-in-head radius, for example; the left half of a user's eye-in-head radius may be mapped to the 180° of the virtual environment to the left of the user, while the right half is mapped to the 180° to the left of the user. Of course, other linear/non-linear mappings may be applied.

By implementing such a feature, the number of snaps that need to be performed may be reduced; this has the additional effect of reducing the amount of head motion that would be required relative to a user not able to perform such a snap rotation. It is therefore apparent that this feature may be entirely complementary to the use of the user profile information as discussed with reference to FIGS. 5 and 6 of the specification.

Figure 8:
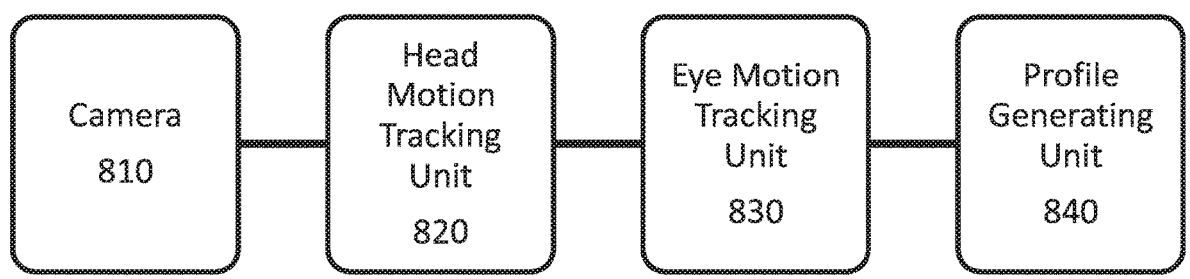
FIG. 8 schematically illustrates a user profile generating system.

FIG. 8 schematically illustrates a user profile generating system 800 for generating a user profile for use with a processing device operable to display content. The system 800 comprises one or more cameras 810, a head motion tracking unit 820, an eye motion tracking unit 830 and a profile generating unit 840.

The one or more cameras 810 are operable to capture images of a user; examples of suitable devices include any visible light or IR cameras that capture images that may be used to identify motion of a user and/or the user's eyes. In some embodiments, cameras are used to detect both head and eye motion of a user, while in others specialised cameras (or other tracking devices) may be used to determine each motion. For example, imaging devices may be present in an HMD that are used to track eye motion.

The head motion tracking unit 820 is operable to identify head motion of the user, for example from images of the user captured by the one or more cameras 810. This may be achieved using any suitable motion tracking method. In some embodiments, the user may wear one or more markers that are used to simplify camera-based tracking methods. Alternatively, or in addition, the head motion tracking unit 820 may use motion sensor data (such as from an accelerometer mounted upon an HMD worn by a user)—it is not essential that captured images are used to detect user head motion. It is therefore apparent that the head motion tracking unit is operable to identify head motion in dependence upon motion sensor data and/or camera data.

The eye motion tracking unit 830 is operable to identify eye motion from images of the user; this may be performed using images captured by the one or more cameras 810. Each eye may be tracked individually, or a single eye may be tracked and models used to predict a point of focus in dependence upon this, for example. Of course, some embodiments may not make use of cameras for performing eye tracking—in such cases, the eye motion tracking unit 1530 may instead perform processing to infer or predict a gaze direction.

For example, information may be gathered during the calibration process (or indeed, at any other time) that correlates head motion with the viewing of a particular area of the screen—the difference between the head orientation and the direction of the target may be taken to be indicative of an eye position of the user. A model may be generated, for example, that may be used to generate a predicted gaze direction based upon a measured head motion, and therefore a detection of the actual position of a user's eyes using image-based detection methods may be rendered unnecessary.

Other examples of methods that would not rely on explicit imaging of a user's eyes would include predictive methods, such as those based upon a user's past actions or known preferences. For example, if it is known that a user only likes to play a game for an hour, then any head motion towards a 'quit' option at this time may be taken to be indicative of the user's desire to quit the game. Similar methods may use information about which elements a user would typically view in a displayed image, with information either being provided by the user or being captured in a calibration process or the like.

The profile generating unit 840 is operable to generate a user profile comprising head motion and eye motion information for the user. This motion information may be generated over any suitable period of time—for example, over a short calibration period, or over the whole of the user's experience with the system such that the profile is updated constantly. The generated user profile is used to modify interactions between the user and a processing device; as discussed above, this may be performed by modifying content in response to a calibration process using the profile information, or by modifying content in response to a characterisation of user interactions as compared to the user profile information. Hence the head motion information and the eye motion information may be understood to optionally comprise head motion preference information and eye motion preference information, characterising the user's behaviour optionally as a mainly head-movement user or a mainly eye-movement user, and/or optionally defining an angular extent from a default position for an object of interest beyond which the user will move their head. Any other information relevant to the user profile described herein may of course be included as appropriate.

As described above, a user profile identifies user preferences for eye motion and head motion. In some embodiments the user profile identifies proportions of head motion and eye motion used by a user in performing one or more viewing transitions between displayed content elements, and may also (or instead) identify a user as belonging to one or more categories in dependence upon their preferences for eye motion and head motion.

Interactions, as referred to above, may be any one or more of the list comprising viewing content, gaze-based inputs, gesture inputs, spoken inputs, and control device inputs. For example, a viewer that observes content is considered to be interacting with the content, as is a user who provides an input based upon their gaze direction, a hand or arm gesture, a voice command or a button press on a game controller. Of course, in some embodiments it is considered that a gaze direction may be combined with one or more of the other inputs to determine an interaction that is to take place.

Figure 9:
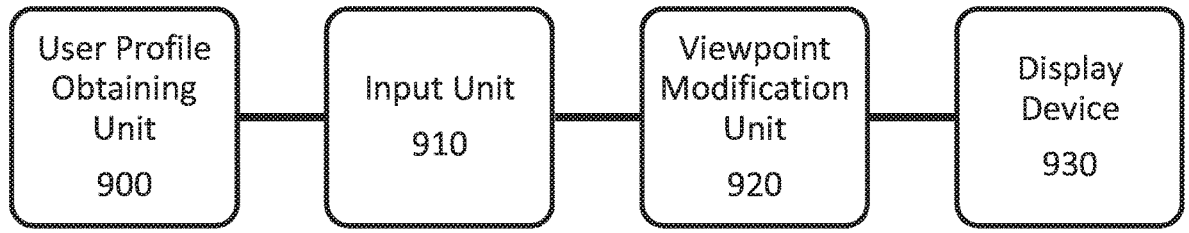
FIG. 9 schematically illustrates a user input system.

FIG. 9 schematically illustrates a user input system for controlling a viewpoint within displayed content. The system comprises a user profile obtaining unit 900, an input unit 910, a viewpoint modification unit 920 and, optionally, a display device 930.

The user profile obtaining unit 900 is operable to obtain a user profile comprising information about head motion and eye motion for a user.

The input unit 910 is operable to receive user inputs relating to a change in viewpoint within displayed content; these inputs may comprise any combination of eye motion, head motion, gestures and/or button presses, for example.

The viewpoint modification unit 920 is operable to modify the viewpoint in the displayed content, the modification to the viewpoint comprising a greater or smaller motion than the head motion received as an input. The greater motion may be limited to the rotational component(s) of the input head motion on one or more axes, or in principle may be limited to the translational component(s) on one or more axes, or may be scaling (i.e. amplification) of the actual input head motion, which may comprise a mixture of rotational and translational components as appropriate.

Hence more generally the modification to the viewpoint may correspond to an amplification of an input head motion using an amplification factor to scale the input, optionally constrained to specific linear and/or rotational axes as appropriate; examples of this are provided below. As discussed above, the modification to the viewpoint may instead correspond to a reduction of an input head motion using a reduction factor to scale the input. In summary, the modification to the viewpoint corresponds to a modification of an input head motion using a modification factor to scale the input.

In some examples, the modification factor is increased for a user with a user profile that indicates that they seek to avoid head motion. Alternatively, or in addition, the modification factor is increased for a user that has been viewing the displayed content for an above-threshold duration of time and/or the modification factor is increased for a modification to the viewpoint of an above-threshold magnitude.

In some embodiments, the modification factor varies throughout the duration of a head motion input. Alternatively, or in addition, the modification factor is selected such that the user is able to view the whole of a virtual environment within their range of comfortable motion as indicated by the user profile.

Typically input head motion is predominantly rotational, as users look around from a relatively fixed position. Hence one or more of the roll, pitch or yaw translations may be amplified.

However, users can also perform translation actions, such as to 'look around a corner' in a virtual environment, or to peer towards an item of interest (or lean back from a threat). Hence optionally one or more of x-axis, y axis, and/or z-axis translations may be modified in the manner described herein.

More typically, input head motion is a mixture of rotational and translational motion, even if the user subjectively seeks only to rotate their head; hence optionally all six axes of the input head motion (x, y, z, roll, pitch and yaw) may be amplified, optionally by different respective amounts, in response to an input head motion. Hence yaw may have an amplification factor greater than 1, as might pitch. Meanwhile for example, roll, which does not change the direction of view, may have an amplification factor of 1.0 (put another way, it may not be amplified at all)

As noted above, different axes may have different amplification factors. Hence, for example, yaw and pitch may have respective amplifications having a 16:9 ratio, mirroring the ratio of distances to traverse a typical display area. Any suitable difference in respective amplification factor may be selected as appropriate by a designer, or the same amplification factor may be use.

Any suitable combination of the examples provided may be utilised in embodiments of the present invention. It should also be noted that while the description has been concerned largely with the amplification of the rotational motion of a user's head in changing the viewpoint, in some embodiments the modification to the viewpoint also comprises a greater change in pitch than the head motion received as an input.

The display device 930 is operable to display the modified viewpoint to the user. The display device may be an HMD, for example, or a display screen such as a television.

Figure 10:
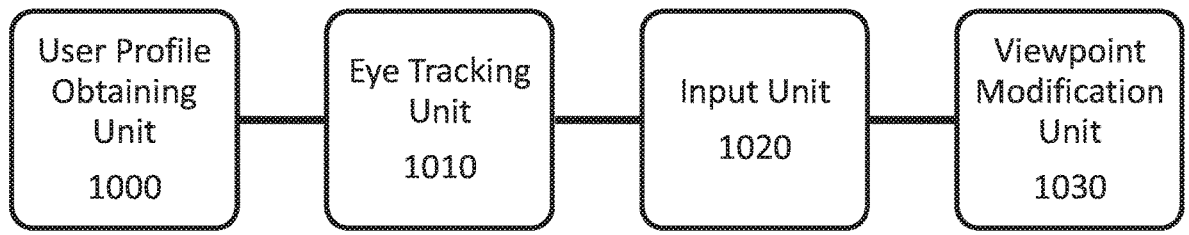
FIG. 10 schematically illustrates a further user input system.

FIG. 10 schematically illustrates a user input system for controlling a viewpoint within displayed content. The system comprises a user profile obtaining unit 1000, an eye tracking unit 1010, an input unit 1020, and a viewpoint modification unit 1030.

The user profile obtaining unit 1000 is operable to obtain a user profile comprising information about head motion and eye motion for a user.

The eye tracking unit 1010 is operable to track a user's eye position and determine a gaze direction of the user. The eye tracking unit 1010 may comprise one or more cameras operable to capture images of one or both of the user's eyes and a processing element, for example.

The input unit 1020 is operable to receive user inputs relating to a change in viewpoint within displayed content; these inputs may comprise any combination of gestures and/or button presses, for example.

The viewpoint modification unit 1030 is operable to cause the viewpoint to shift by a predetermined amount in dependence upon a user's eye position and information contained in the user profile. As discussed above, this may comprise applying a snap rotation in dependence upon user profile information and a gaze direction of the viewer at the time of providing the input.

Figure 11:
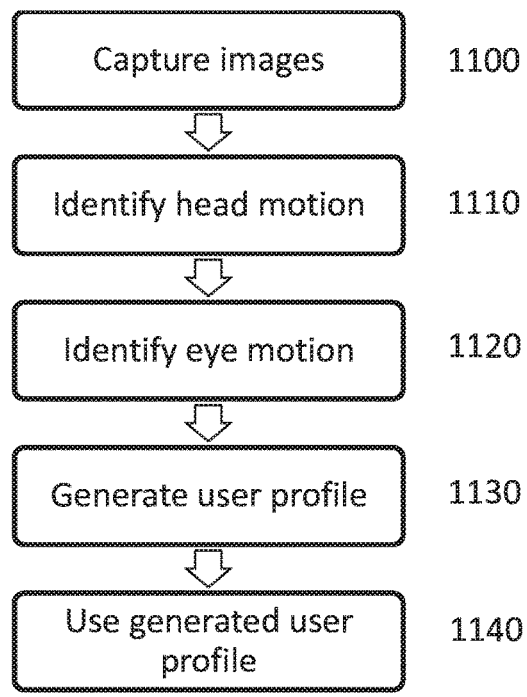
FIG. 11 schematically illustrates a user profile generating method.

FIG. 11 schematically illustrates a user profile generating method for generating a user profile for use with a processing device operable to display content.

A step 1100 comprises capturing images of a user; this step 1100 may further comprise gathering data from inertial sensors or the like that may also be used to identify motion of the user.

A step 1110 comprises identifying head motion of the user.

A step 1120 comprises identifying eye motion from images of the user.

A step 1130 comprises generating a user profile comprising information about head motion and eye motion for the user.

Figure 12:
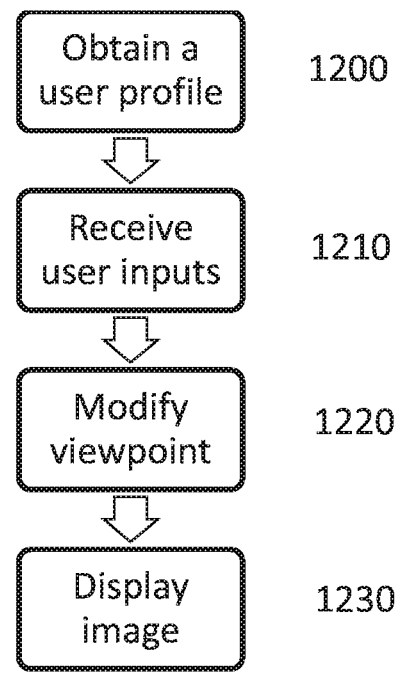
FIG. 12 schematically illustrates a user input method.

A step 1140 comprises using the generated user profile to modify interactions between the user and a processing device. FIG. 12 schematically illustrates a method in which the user profile is used to modify interactions, in which the modification includes varying a change in viewpoint for a given user eye/head motion in dependence upon information in the user profile.

FIG. 12 schematically illustrates a user input method for controlling a viewpoint within displayed content.

A step 1200 comprises obtaining a user profile comprising information about head motion and eye motion for a user.

A step 1210 comprises receiving user inputs relating to a change in viewpoint within displayed content, the user inputs comprising the user's head motion.

A step 1220 comprises modifying the viewpoint in the displayed content in dependence upon received inputs and the user profile, wherein the modification to the viewpoint comprises a greater or smaller motion than the head motion received as an input.

Figure 13:
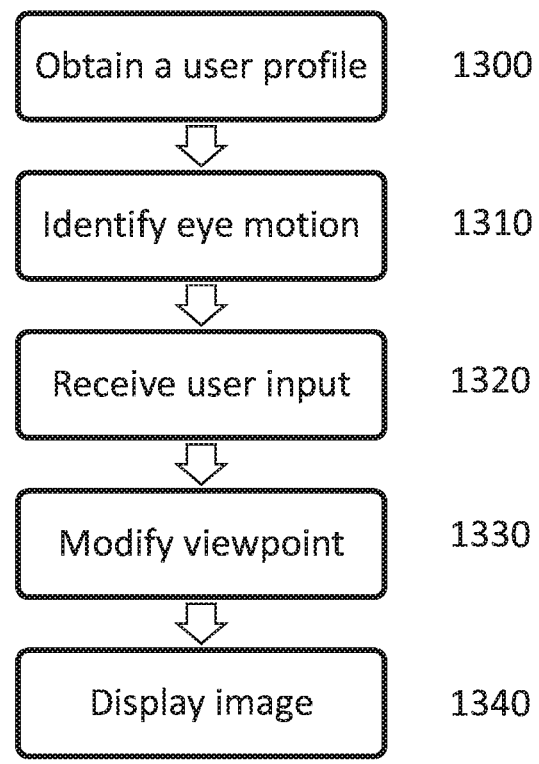
FIG. 13 schematically illustrates a further user input method.

FIG. 13 schematically illustrates a user input method for controlling a viewpoint within displayed content.

A step 1300 comprises obtaining a user profile comprising information about head motion and eye motion for a user.

A step 1310 comprises identifying a user's eye position and/or determining a gaze direction of the user.

A step 1320 comprises receiving user inputs relating to a change in viewpoint within displayed content; these inputs may comprise any combination of gestures and/or button presses, for example.

A step 1330 comprises modifying the viewpoint so as to cause it to shift by a predetermined amount in dependence upon a user's eye position and information contained in the user profile.

A step 1340 comprises displaying an image to the user of the modified viewpoint.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A user input system for controlling a viewpoint within displayed content, the system comprising:
   a user profile obtaining unit operable to obtain a user profile comprising information about head motion and eye motion for a user;
   an input unit operable to receive user inputs relating to a change in viewpoint within displayed content, the user inputs comprising the user's head motion; and
   a viewpoint modification unit operable to modify the viewpoint in the displayed content in dependence upon received inputs and the user profile,
   wherein the modification to the viewpoint comprises a greater or smaller motion than the head motion received as an input, and
   wherein the user profile identifies user preferences for eye motion and head motion.

2. The user input system according to claim 1, wherein the user profile identifies proportions of head motion and eye motion used by a user in performing one or more viewing transitions between displayed content elements.

3. The user input system according to claim 1, wherein the input unit is also operable to receive user inputs comprising the user's eye motion.

4. The user input system according to claim 1, wherein the modification to the viewpoint corresponds to a modification of an input head motion using a modification factor to scale the input.

5. The user input system according to claim 4, wherein the modification factor is increased for a user with a user profile that indicates that they seek to avoid head motion.

6. The user input system according to claim 4, wherein the modification factor is increased for a user that has been viewing the displayed content for an above-threshold duration of time.

7. The user input system according to claim 4, wherein the modification factor is increased for a modification to the viewpoint of an above-threshold magnitude.

8. The user input system according to claim 4, wherein the modification factor varies throughout the duration of a head motion input.

9. The user input system according to claim 4, wherein the modification factor is selected such that the user is able to view the whole of a virtual environment within their range of comfortable motion as indicated by the user profile.

10. The user input system according to claim 1, wherein the modification to the viewpoint also comprises a greater change in pitch than the head motion received as an input.

11. The user input system according to claim 1, comprising a display device operable to display the modified viewpoint to the user.

12. A user input method for controlling a viewpoint within displayed content, the method comprising:
    obtaining a user profile comprising information about head motion and eye motion for a user;
    receiving user inputs relating to a change in viewpoint within displayed content, the user inputs comprising the user's head motion; and
    modifying the viewpoint in the displayed content in dependence upon received inputs and the user profile,
    wherein the modification to the viewpoint comprises a greater or smaller motion than the head motion received as an input, and
    wherein the user profile identifies user preferences for eye motion and head motion.

13. A non-transitory machine-readable storage medium which stores computer software, which when executed by a computer, causes the computer to carry out actions for controlling a viewpoint within displayed content, the actions comprising:
    obtaining a user profile comprising information about head motion and eye motion for a user;
    receiving user inputs relating to a change in viewpoint within displayed content, the user inputs comprising the user's head motion; and
    modifying the viewpoint in the displayed content in dependence upon received inputs and the user profile,
    wherein the modification to the viewpoint comprises a greater or smaller motion than the head motion received as an input, and
    wherein the user profile identifies user preferences for eye motion and head motion.

* * * * *